(12) United States Patent
Simons

(10) Patent No.: US 7,082,845 B2
(45) Date of Patent: Aug. 1, 2006

(54) DEVICE FOR LEAF CHAIN LOAD CELL

(75) Inventor: Gerald Simons, Toronto (CA)

(73) Assignee: Weigh Point Incorporated, Cambridge (CA)

( * ) Notice: Subject to any disclaimer, the term of this patent is extended or adjusted under 35 U.S.C. 154(b) by 0 days.

(21) Appl. No.: 10/936,336

(22) Filed: Sep. 7, 2004

(65) Prior Publication Data
US 2005/0132818 A1    Jun. 23, 2005

Related U.S. Application Data

(60) Provisional application No. 60/500,865, filed on Sep. 5, 2003.

(51) Int. Cl.
*G01L 1/00*    (2006.01)
(52) U.S. Cl. .................................. 73/862.382
(58) Field of Classification Search ........... 73/862.382, 73/862.045, 862.56
See application file for complete search history.

(56) References Cited

U.S. PATENT DOCUMENTS

| | | | | |
|---|---|---|---|---|
| 5,783,755 A | * | 7/1998 | Bruns ..................... | 73/862.541 |
| 5,836,548 A | * | 11/1998 | Dietz et al. .............. | 244/137.1 |
| 6,232,566 B1 | * | 5/2001 | Bruns ......................... | 177/139 |
| 6,264,004 B1 | | 7/2001 | Miyamoto | |
| 2003/0006853 A1 | * | 1/2003 | Yamanaka et al. .......... | 331/158 |
| 2004/0139806 A1 | * | 7/2004 | Christmas .............. | 73/862.041 |
| 2004/0166730 A1 | * | 8/2004 | Wascow et al. ............. | 439/577 |
| 2005/0051367 A1 | * | 3/2005 | Hagen et al. ................. | 177/59 |
| 2005/0189200 A1 | * | 9/2005 | Hill et al. .............. | 198/810.04 |

* cited by examiner

*Primary Examiner*—Edward Lefkowitz
*Assistant Examiner*—George P Bonanto
(74) *Attorney, Agent, or Firm*—Hodgson Russ LLP

(57) ABSTRACT

A device having integrally formed channels that prevent forces on a sensor cable from damaging a load cell such that if the cable is overloaded it will break but the strain gauge within the load cell will be protected.

17 Claims, 6 Drawing Sheets

DEVICE FOR LEAF CHAIN LOAD CELL

CROSS-REFERENCE TO RELATED APPLICATION

The present application claims priority to U.S. Provisional Patent Application No. 60/500,865 filed Sep. 5, 2003 and entitled "Device for Leaf Chain Load Cell," which is incorporated herein by reference.

FIELD OF INVENTION

The present invention relates generally to weighing systems for lift trucks and particularly to a device for protecting a chain-mounted load cell.

BACKGROUND OF THE INVENTION

One form of weighing device used with lift trucks is a chain-mounted load cell. One problem associated with these devices occurs when the cables exiting the load cell are accidentally snagged. Excessive pulling of the cable will not only snap the cable but also damage the strain gauge circuitry contained within the load cell. Accordingly, there is a need for a device for protecting a chain-mounted load cell.

SUMMARY OF THE INVENTION

The present invention meets the above-described need by providing a device having integrally formed channels that prevent forces on the cable from damaging the load cell such that if the cable is overloaded it will break but the strain gauge within the load cell will be protected.

BRIEF DESCRIPTION OF THE DRAWINGS

The invention is illustrated in the drawings in which like reference characters designate the same or similar parts throughout the figures of which.

DETAILED DESCRIPTION

Figure 1:
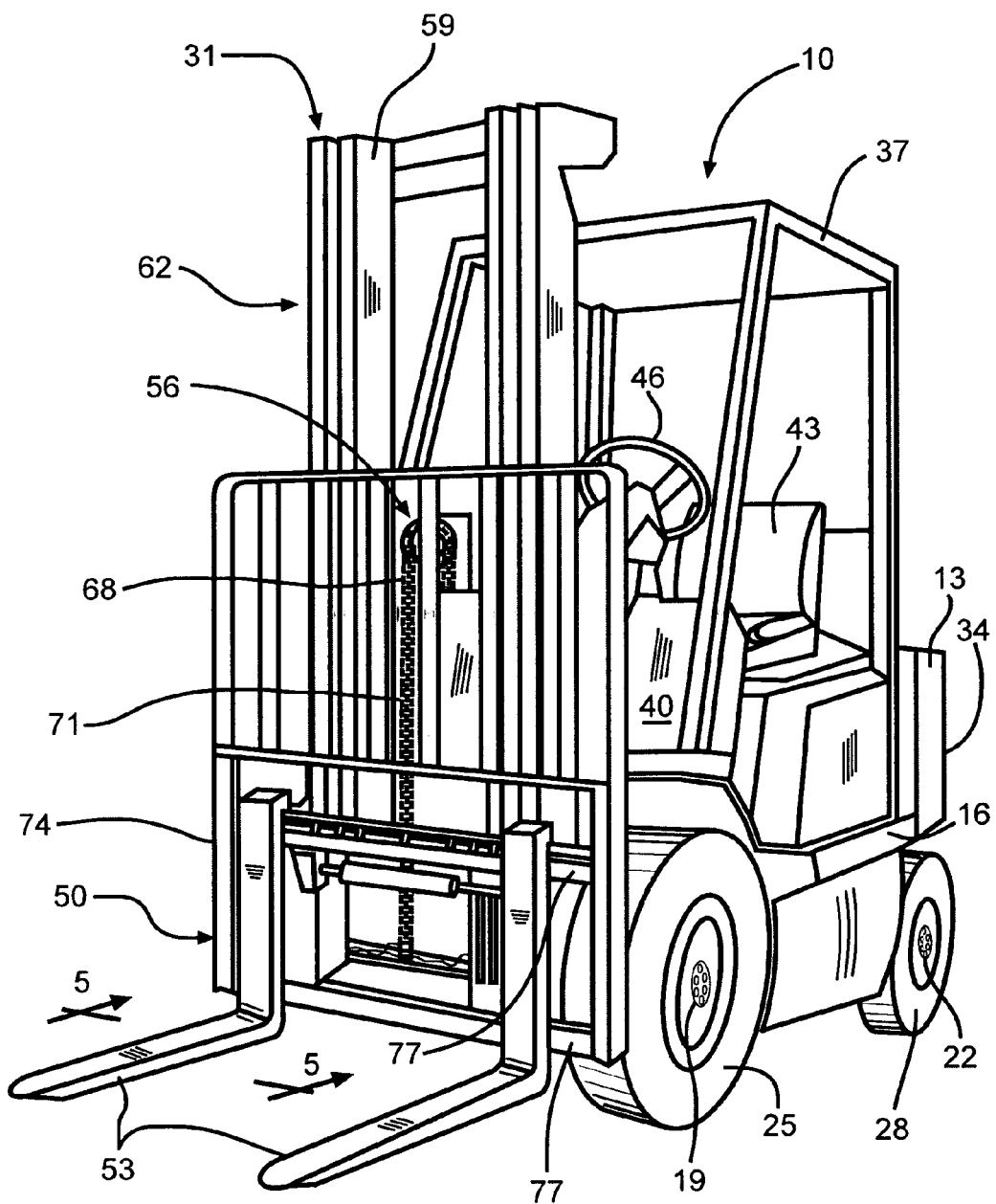
FIG. 1 is a perspective view of a lift truck according to the invention.

In FIG. 1, a lift truck 10 comprises: a vehicle body 13 integrally formed with a truck chassis 16 and a rigid front axle assembly 19; a swingable rear suspension including a rear axle assembly 22; a pair of left and right front wheels 25 as driving solid or air-tube wheels supported by the front axle assembly 19 relative to the truck chassis 16; a pair of left and right rear wheels 28 as steering air-tube wheels supported by the rear axle assembly 22 and swingably suspended by the rear suspension from the truck chassis 16; and the mast apparatus 31 pivoting on the front axle assembly 19.

The vehicle body 13 is thus directly or indirectly supported by the front and rear wheels 25 and 28 relative to the ground, and is integrally provided with a counter weight 34, and a combination of a head guard 37 and a front guard 40 for protecting a lift operator or truck driver (not shown) sitting on an operator's seat 43 which is mounted on a central portion of the truck chassis 16.

The vehicle body 13 has mounted thereon: a vehicle drive system including an engine and a power train having a transmission (not shown); an operation system including a steering wheel 46 projecting over an instrument panel provided inside the front guard 40, and acceleration and brake pedals, as well as mast and fork control levers and/or switches; a hydraulic system including a pump, hydraulic circuitry and a reservoir; an electrical system including a generator, a battery assembly, electric circuitry, controls, indicators, lights, etc., (not shown) with part of the wiring on the mast apparatus 31.

The mast apparatus 31 comprises: a carriage 50 for carrying a load-handling attachment, i.e., a pair of left and right forks 53 in the embodiment; a pair of left and right lift drives 56 synchronously operable for driving the carriage 50 to be lifted and lowered; a gate-like mast assembly 59 including a pair of left and right vertical guide masts 62 for guiding the carriage 50 there along, as it is lifted or lowered by the lift drives 56; and a pair of left and right swing restriction members 68 fixed alongside the guide masts 62 for restricting swing motions of the of lift chains 71.

The carriage 50 comprises a grating frame as a rigid assembly including a rectangular load-backrest 74 and a pair of upper and lower transverse finger bars 77. The forks 53 are hung on the finger bars 77 and locked or fastened thereto. The forks 53 may be replaced by any load-handling attachment for supporting a burden, a cargo, a freight, goods, a load or luggage (hereafter collectively called "load") scooped or picked up thereon or clamped or held thereto. There may be employed a side shift and/or a reach fork.

Figure 2:
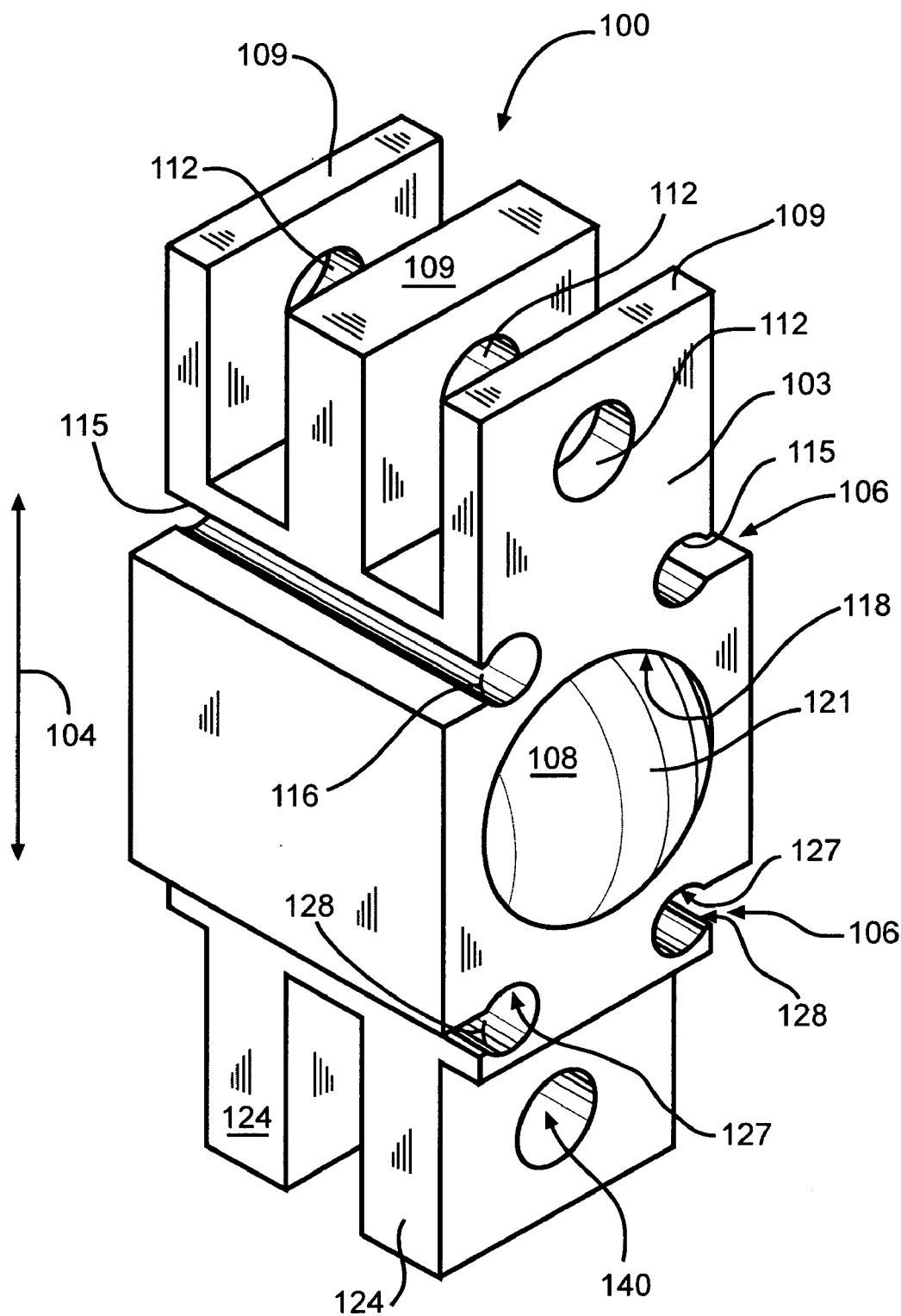
FIG. 2 is perspective view of the protecting device of the present invention.

Turning to FIG. 2, the cable protecting device 100 of the present invention is a strain gauge load cell sensor 103 having stress relief channels 106 disposed about the load cell 108. The sensor 103 has three link ends 109 extending from a first end of the sensor 103. The link ends 109 extend axially in the direction indicated by arrow 104. The link ends 109 have openings 112 disposed transverse to the direction of the link ends 109. The transverse openings 112 on each link end 109 are aligned. On opposite sides of the link ends 109, the stress relief channels 106 comprise transverse slots 115 disposed in the sensor 103. The slots 115 are arcuate and have an opening 116 on one side that extends for the length of the slot. The slots 115 are sized such that a cable 150 (FIG. 3) can be received in the slot 115 through opening 116 and held by a frictional fit. In the middle of the sensor 103, a transverse opening 118 houses the sensor elements 121 (including load cell 108).

At the opposite end of the sensor 103, a pair of link ends 124 extend in the opposite direction from link ends 109. On opposite sides of link ends 124, there are transverse slots 127. The slots 127 are arcuate and have an opening 128 on one side that extends for the length of the slot 127. An opening 140 is disposed transverse to the link end 124. The opening 140 receives a pin 170 (FIG. 6) that connects the link ends 124 to adjacent link ends attached to the carriage 50.

Figure 3:
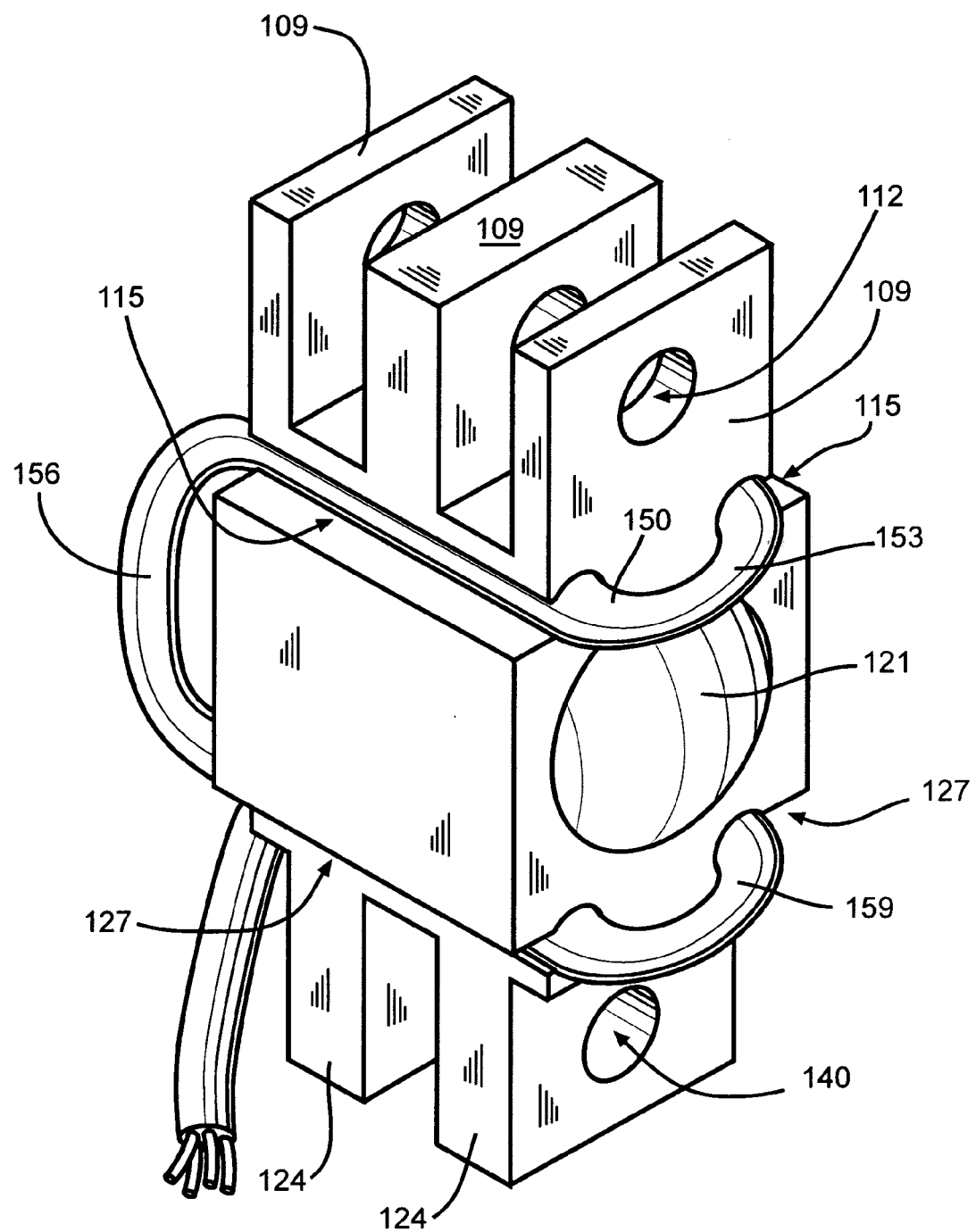
FIG. 3 is a perspective view of the protecting device of the present invention with a cable inserted therein.

Turning to FIG. 3, the cable 150 is shown extending through a first transverse slot 115. At the end of the slot 115, the cable 150 has a curved section 153 where the cable 150 enters the opposed slot 115. At the end of the opposed slot 115, the cable loops downward in a downward curving section 156 and then enters one of the transverse slots 127.

At the end of the first slot 127, the cable 150 has a curved section 159 where the cable 150 extends to the opposite slot 127. From the end of the opposite slot 127 the cable 150 extends to a cable harness 180 (FIG. 5) located inside the mast apparatus 31 of the lift truck 10.

Figure 4:
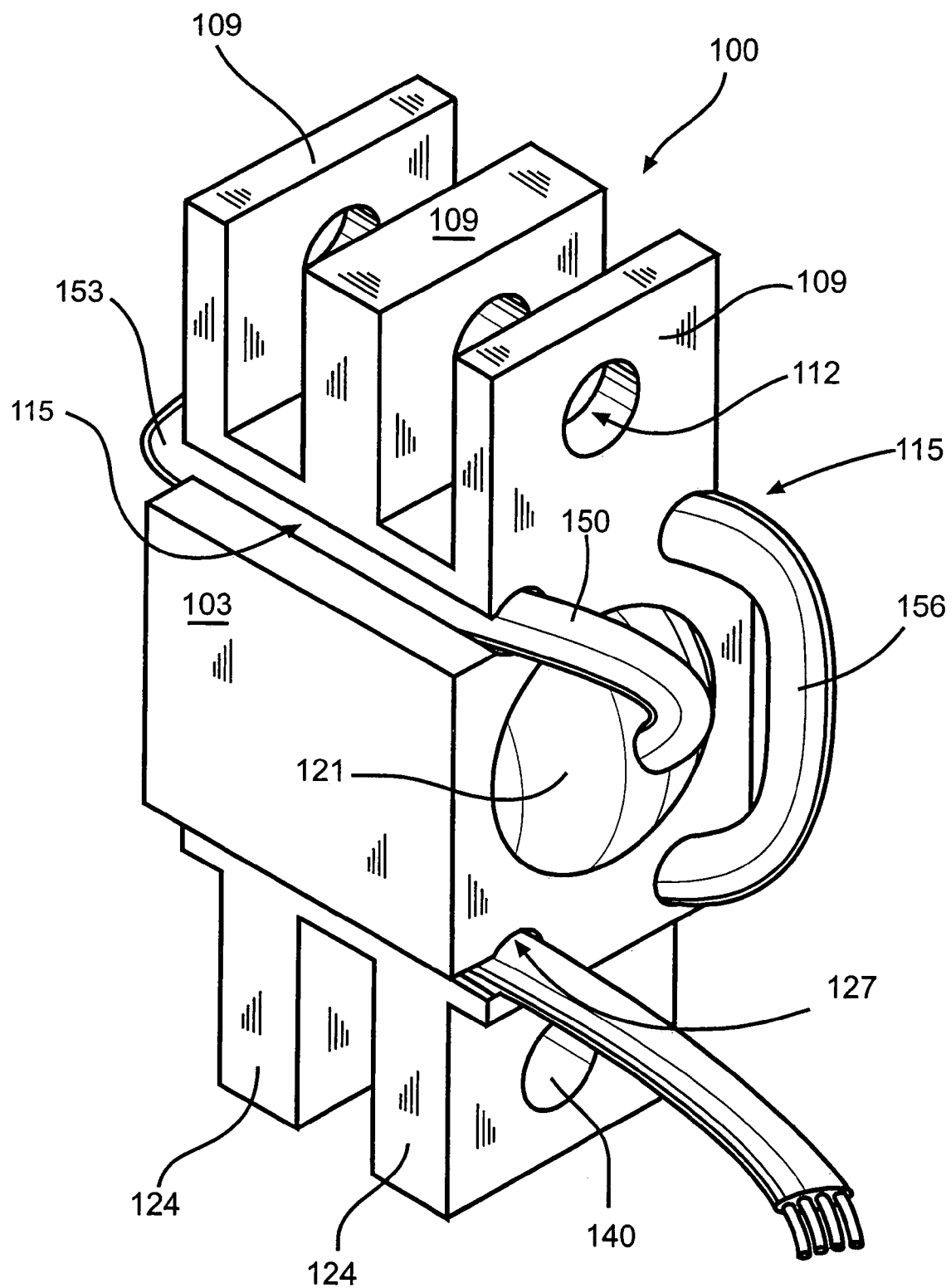
FIG. 4 is a perspective view of the opposite side of the protecting device shown in FIG. 3.

In FIG. 4, the opposite side of protecting device 100 is shown. The cable 150 exits from the load cell sensor elements 121 and curves upward into the first transverse slot 115. As described above, the cable 150 extends along the first slot 115 and then curves and enters the opposed slot 115. At the end of the opposed slot 115, the cable 150 extends downward through curved section 156 and enters a first transverse slot 127. At the end of the first slot 127, the cable 150 curves and enters the opposed slot 127. At the end of slot 127, the cable 150 exits from the cable protecting device 100 and extends to a cable harness 180 (FIG. 5) in the mast apparatus 31 of the lift truck 10.

Figure 5:
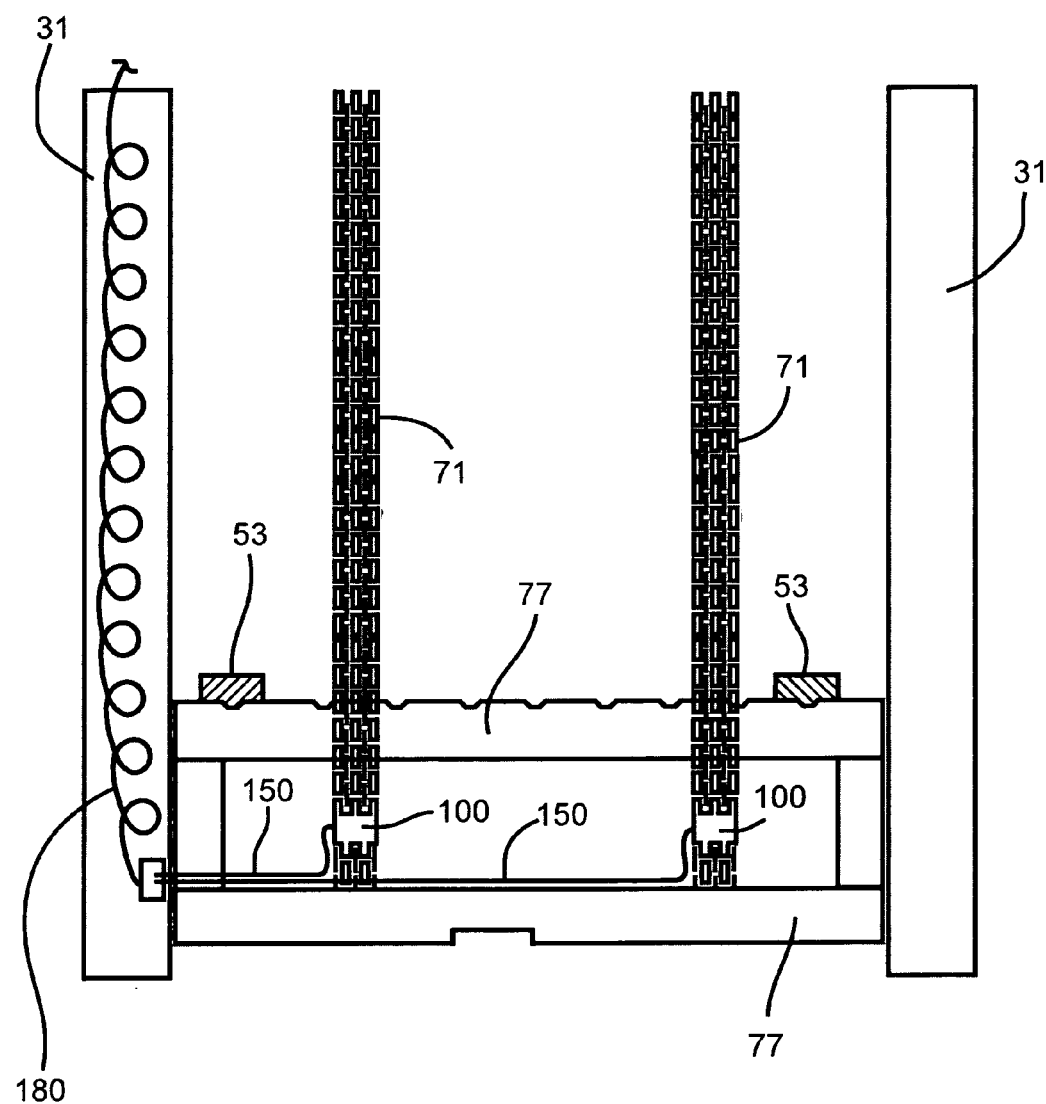
FIG. 5 is a partial front elevational view taken along lines 5—5 of FIG. 1; and, FIG. 6 is a partial front exploded elevational view of the present invention installed in the chain of a lift truck.
Figure 6:
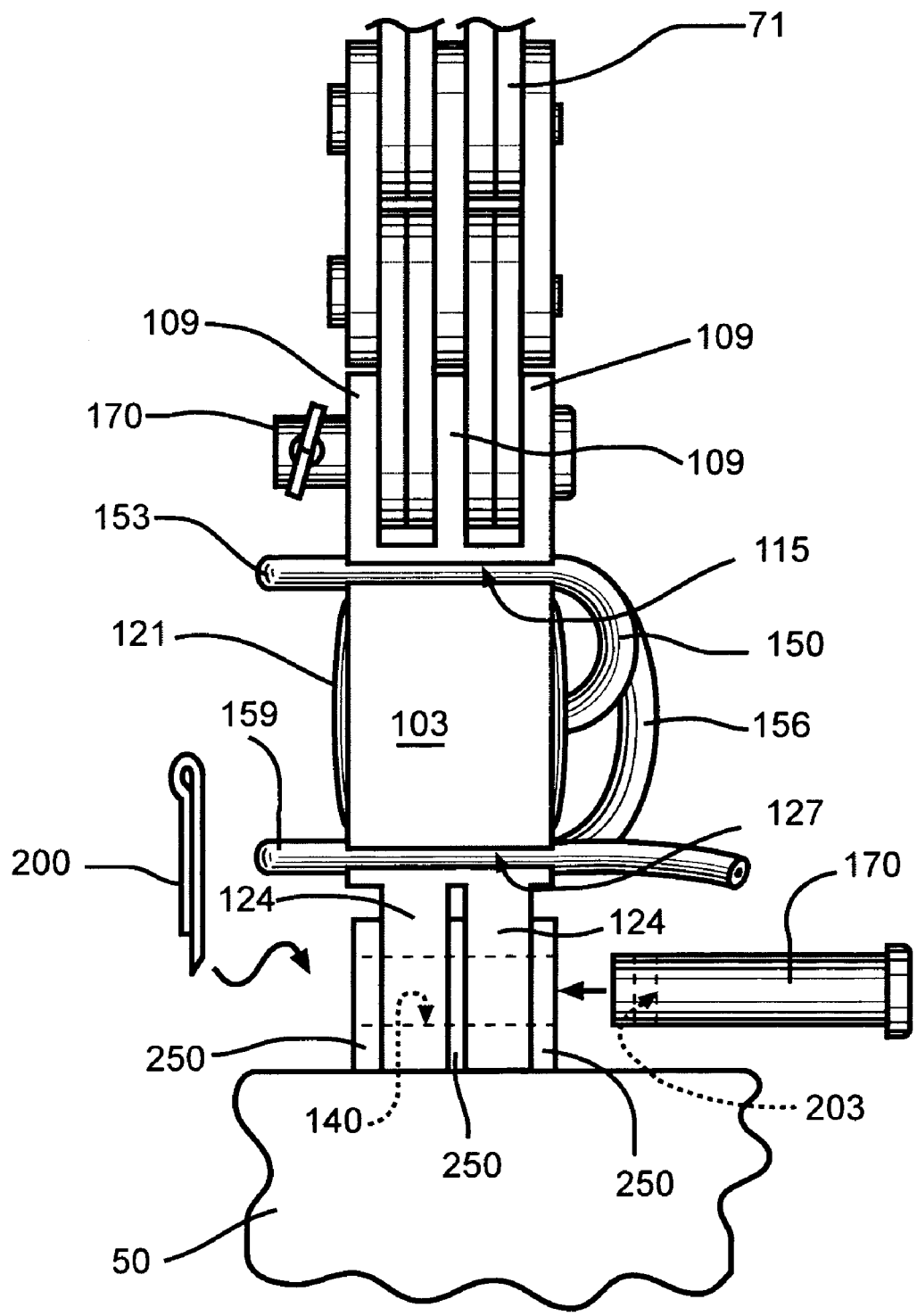

In FIG. 5, the cable protecting device 100 of the present invention is shown in one position where it attaches to the lift chains 71 of the lift truck 10. Link ends 109 extend upward with respect to FIG. 5 and intercalate with the adjacent link ends in the lift chains 71. A pin 170 (FIG. 6) is used to connect the link ends 109 to the remainder of the chains 71. At the opposite end, the link ends 124 may connect directly to link ends extending from the carriage 50 (as shown in FIG. 6). The link ends 124 intercalate with the link end members 250 extending from the carriage 50. The cable 150 extends through the cable protecting device 100 as described above and then extends across to the mast apparatus 31 where it enters a cable harness 180 that extends up the mast apparatus 31.

As shown in FIG. 6, the cable protecting device 100 of the present invention is connected to the adjacent link ends by means of pins 170 as known to those of ordinary skill in the art. The pins 170 have an opening 203 that receives a key or cotter pin 200.

In use, the cable protecting device 100 is connected to the lift chains 71 of a lift truck 10. The link ends 109 and 124 are attached to adjacent link ends extending from the standard chain links disposed above the device 100 and are attached to the carriage 50 by means of link ends 250. The protecting device 100 provides integrally formed stress relief channels 106 disposed about the load cell sensor 103 that prevent forces on the cable 150 from damaging the load cell 108 such that if the cable 150 is overloaded it will break but the strain gauge sensing elements 121 and the load cell 108 will be protected. The cable 150 exits the sensing element 121 of the device 103 and is inserted into slots 115 and 127 such that the cable 150 is disposed about the device 100. The cable 150 is held in the slots 115 and 127 by a frictional fit. In the event that the cable 150 becomes snagged, the circuitous route of the cable 150 through slots 115 and 127 will serve to isolate the tension on the cable 150 from the sensor element 121. Accordingly, the cable 150 will break without damaging the sensing elements 121. The cable 150 can then be repaired by splicing, replacing, or the like.

In the embodiment shown, slots 115 and 127 are disposed about the cable protecting device 100 in one arrangement that provides protection for the cable 150. The device of the present invention could also be formed with additional channels to provide for additional looping of the cable 150. Also, although the cable 150 is shown extending through both slots 115 and 127, the cable 150 may be looped through a single set of slots 115 or 127. Although this arrangement is possible, it would offer less protection for the cable 150. Also, the slots 115 and 127 do not have to be oriented transverse to the axis 104 of the link ends. The slots could be angled at other angles relative to the axis 104 and there could be other configurations as will be apparent to those of ordinary skill in the art.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A sensor protecting device, comprising:
   a sensor housing having a first plurality of link ends extending in a first direction, the first plurality of link ends having a proximal portion, a distal portion, and a first transverse opening defined therein, the sensor housing having a second plurality of link ends extending in a second direction opposite the first direction, the second plurality of link ends having a proximal portion, a distal portion, and a second transverse opening defined therein;
   at least one first slot disposed at the proximal portion of the first plurality of link ends;
   at least one second slot disposed at the proximal portion of the second plurality of link ends;
   a sensor disposed in the sensor housing; and,
   a sensor cable disposed in the at least one first and second slots.

2. The sensor protecting device of claim 1, wherein the at least one first slot comprises a pair of first slots disposed on opposite sides of the first plurality of link ends.

3. The sensor protecting device of claim 1, wherein the at least one second slot comprises a pair of second slots disposed on opposite sides of the second plurality of link ends.

4. The sensor protecting device of claim 1, wherein the at least one first and second slots are disposed transverse to the first and second plurality of link ends.

5. The sensor protecting device of claim 1, wherein the first and second slots are arcuate.

6. The sensor protecting device of claim 1, wherein the first and second slots are integrally formed in the proximal portions of the first and second plurality of link ends.

7. The sensor protecting device of claim 1, wherein the sensor comprises a strain gauge.

8. The sensor protecting device of claim 1, wherein the sensor comprises a load cell.

9. A sensor protecting device for use in a lift truck having a chain mounted sensor attached to a carriage, the sensor protecting device, comprising:
   a sensor housing having a first plurality of link ends extending in a first direction and capable of intercalating with the chain on the lift truck, the sensor housing having a second plurality of link ends extending in a second direction opposite the first direction, the second plurality of link ends capable of being connected to the carriage, the sensor housing having a pair of first slots disposed on opposite sides of the first plurality of link ends, the sensor housing having a pair of second slots disposed on opposite sides of the second plurality of link ends;
   a sensor disposed in the sensor housing; and,
   a sensor cable extending from the sensor and disposed through the pairs of first and second slots such that tension on the sensor cable is prevented from damaging the sensor.

10. The sensor protecting device of claim 9, wherein the first plurality of link ends contain transverse slots for receiving a connecting pin.

11. The sensor protecting device of claim 9, wherein the second plurality of link ends contain transverse slots for receiving a connecting pin.

12. The sensor protecting device of claim 9, wherein the first and second slots are arcuate.

13. The sensor protecting device of claim 9, wherein the first and second slots are integrally formed in the first and second plurality of link ends.

14. The sensor protecting device of claim 9, wherein the first and second slots are disposed transverse to the first and second plurality of link ends.

15. The sensor protecting device of claim 9, wherein the sensor is a strain gauge.

16. The sensor protecting device of claim 9, wherein the sensor is a load cell.

17. A sensor protecting device, comprising:
   a sensor housing having a central portion containing a sensor, the central portion having a first plurality of link ends and a second plurality of link ends extending therefrom, the first and second plurality of link ends having transverse slots;

a pair of first slots disposed perpendicular to the plurality of first link ends, the pair of first slots disposed on opposite sides of the plurality of first link ends, the first slots formed at a junction of the central portion and the plurality of first link ends;

a pair of second slots disposed perpendicular to the plurality of first link ends, the pair of second slots disposed on opposite sides of the plurality of second link ends, the second slots formed at a junction of the central portion and the plurality of second link ends; and, a sensor cable extending from the sensor and disposed through the first and second slots such that tension on the sensor cable is prevented from damaging the sensor.

* * * * *